US012083656B2

(12) United States Patent
Canlas, Jr. et al.

(10) Patent No.: US 12,083,656 B2
(45) Date of Patent: Sep. 10, 2024

(54) FASTENER DRIVING DEVICE WITH MECHANISMS TO LIMIT MOVEMENT OF NAILS

(71) Applicant: STANLEY FASTENING SYSTEMS, L.P., North Kingstown, RI (US)

(72) Inventors: Prudencio S. Canlas, Jr., North Kingstown, RI (US); Jeff Peng, Taichung (TW); Hao Chang, Taichung (TW); Adam C. Tillinghast, South Kingstown, RI (US)

(73) Assignee: STANLEY FASTENING SYSTEMS, L.P., North Kingstown, RI (US)

( * ) Notice: Subject to any disclaimer, the term of this patent is extended or adjusted under 35 U.S.C. 154(b) by 59 days.

(21) Appl. No.: 17/344,768

(22) Filed: Jun. 10, 2021

(65) Prior Publication Data

US 2021/0299834 A1 Sep. 30, 2021

Related U.S. Application Data

(60) Continuation of application No. 14/175,711, filed on Feb. 7, 2014, now Pat. No. 11,161,230, which is a division of application No. 11/874,621, filed on Oct. 18, 2007, now Pat. No. 8,684,245.

(60) Provisional application No. 60/852,993, filed on Oct. 20, 2006.

(51) Int. Cl.
*B25C 1/00* (2006.01)

(52) U.S. Cl.
CPC .................................... *B25C 1/005* (2013.01)

(58) Field of Classification Search
CPC ................................ B25C 1/001; B25C 1/005
See application file for complete search history.

(56) References Cited

U.S. PATENT DOCUMENTS

| | | | | |
|---|---|---|---|---|
| 3,524,576 A * | 8/1970 | Bader | B25C 1/003 227/136 |
| 3,597,142 A * | 8/1971 | Jasper | B27F 7/025 227/95 |
| 3,703,981 A | 11/1972 | Smith | |
| 3,952,398 A * | 4/1976 | Haytayan | F16B 15/08 29/432 |
| 4,049,181 A | 9/1977 | Kametaki | |
| 4,197,974 A * | 4/1980 | Morton | B25C 1/04 227/8 |
| 4,442,965 A | 4/1984 | Leistner | |

(Continued)

FOREIGN PATENT DOCUMENTS

EP 1 207 017 A2 5/2002

OTHER PUBLICATIONS

Extended Search Report as issued for European Patent Application No. 07844401.5, dated Oct. 29, 2010.

(Continued)

*Primary Examiner* — Gloria R Weeks
(74) *Attorney, Agent, or Firm* — Pillsbury Winthrop Shaw Pittman LLP

(57) ABSTRACT

A fastener driving device includes a housing assembly, a nose assembly connected to the housing assembly, a magazine for carrying a supply of fasteners through a feed channel along a feed direction toward the nose assembly, and a plurality of stop pawls independently movable about a common pivot axis. Each stop pawl has a distal end extending into the feed channel.

24 Claims, 5 Drawing Sheets

(56) References Cited

U.S. PATENT DOCUMENTS 4,463,888 A 8/1984 Geist
4,558,811 A * 12/1985 Klaus ...................... B25C 1/005 227/126
4,657,166 A * 4/1987 Anstett ................... B25C 1/005 227/7
4,784,306 A * 11/1988 Baum ..................... B25C 1/005 227/113
4,858,812 A 8/1989 Fealey
4,942,996 A * 7/1990 Wolfberg ................ B25C 1/003 227/128
5,180,091 A * 1/1993 Ota ....................... B25C 5/1689 227/8
5,240,161 A 8/1993 Kaneko
5,332,141 A 7/1994 Mukoyama et al.
5,522,533 A * 6/1996 Mukoyama ........... B25C 5/1658 227/127
5,593,079 A * 1/1997 Mukoyama ............. B25C 1/047 227/8
5,597,972 A * 1/1997 Wachter .................. B25C 1/184 89/1.14
5,738,266 A 4/1998 Ogawa
5,772,098 A 6/1998 Crutcher
5,839,638 A 11/1998 Ronn
5,975,399 A * 11/1999 Oehri ...................... B25C 1/184 227/126
6,170,730 B1 1/2001 Lin
6,679,414 B2 1/2004 Rotharmel
6,708,860 B1 3/2004 Thieleke
6,796,476 B2 9/2004 Birk et al.
6,808,101 B2 * 10/2004 Laubach ............... B25C 5/1658 227/119
6,908,021 B1 6/2005 Wang
6,966,477 B1 11/2005 Chien-Kuo et al.
6,994,240 B2 2/2006 Jakob et al.
6,997,365 B2 * 2/2006 Miller ..................... B25C 1/008 227/129
7,032,794 B1 * 4/2006 Hung ...................... B25C 1/005 227/8
7,143,508 B2 12/2006 Schnell
7,172,103 B2 2/2007 Fujiyama et al.
7,182,236 B1 2/2007 Wen
7,225,962 B2 6/2007 Porth
7,303,103 B2 12/2007 Wang
7,416,100 B2 8/2008 Fielitz
7,600,661 B2 * 10/2009 Adachi ................... B25C 1/005 227/119
7,686,197 B2 3/2010 Kosuge et al.
7,950,556 B2 5/2011 Hagan
8,302,832 B2 11/2012 Porth et al.
8,684,245 B2 4/2014 Canlas et al.
9,975,229 B2 * 5/2018 Haehndel ................ B25C 1/003
2005/0156006 A1 7/2005 Chen
2007/0267457 A1 * 11/2007 Adachi ................... B25C 1/005 227/129
2009/0114697 A1 5/2009 Gross et al.
2011/0240709 A1 10/2011 Oouchi
2014/0151427 A1 6/2014 Canlas et al.

OTHER PUBLICATIONS

Written Opinion and Search Report as issued for International Application No. PCT/US2007/081786, dated Feb. 4, 2008.

* cited by examiner

FASTENER DRIVING DEVICE WITH MECHANISMS TO LIMIT MOVEMENT OF NAILS

This application is a continuation of U.S. patent application Ser. No. 14/175,711, filed Feb. 7, 2014, which is a divisional application of U.S. patent application Ser. No. 11/874,621, filed Oct. 18, 2007, now U.S. Pat. No. 8,684,245, which in turn claims the benefit of priority from U.S. Provisional Application No. 60/852,993, filed Oct. 20, 2006, the contents of which are incorporated herein in their entireties by reference.

BACKGROUND

Field

The present patent application is directed to fastener driving devices, and more specifically relates to fastener driving devices that incorporate mechanisms for limiting the movement of nails.

Description of Related Art

The construction industry has seen an increase in the use of metal connectors when joining two workpieces together. For example, joist hangers are commonly used in the construction of floors in buildings and outdoor decks. L-shaped metal connectors are also used to connect and/or reinforce two workpieces that are joined together perpendicularly, such as when connecting the framing of two walls. Conventional fastener driving devices, such as pneumatic nailers, have been difficult to use in metal connector applications because of the size of such devices. For example, a conventional pneumatic nailer used for framing applications is designed to drive nails that are 2 to 4 inches in length and have diameters of about 0.113 to 0.162 inches. However, nails that are used to attach metal connectors to workpieces are typically about 1.5 to 2.5 inches in length, and have diameters of about 0.131 to 0.162 inches. While framing nailers may be used to drive the longer metal connector fasteners as well as shorter metal connector fasteners, they are typically not optimally configured to drive shorter metal connector fasteners such as nails that are 1.5 inches in length.

Moreover, the design of conventional pneumatic nailers makes it difficult to accurately locate a fastener into the hole of the metal connector due to the nose assembly and the contact arm. A conventional contact arm is biased to extend past the nose assembly of the nailer so that when the contact arm is pressed against the workpiece, the contact arm cooperates with the trigger to cause the nailer to actuate, and drive the fastener into the workpiece. In many applications, such as framing and finishing, the fastener may be located in a range of locations, i.e. the precise location of the fastener may not be important. However, when driving a nail through a hole of a metal connector, the precision of the drive is important because of the risk of damaging the nailer or the metal connector. In this regard, various conventional fastener driving devices are now being configured to allow use of special removable probes that aid in locating of the holes in the metal connectors.

Users have used the tip of the fastener that protrudes from the nose assembly which is about to be driven as the hole locator. In particular, the nails slightly protruding from the nose assembly of the nail gun are used to locate the hole of the metal connector by sliding the nail tip along the metal connector until it falls into the hole of the metal connector. Then, the nail is driven into the workpiece thereby securing the metal connector to the workpiece. However, such use of the tip of the fastener as a hole locator poses specific problems.

More specifically, when the tip of the nail locates the hole of the metal connector and digs into the workpiece through the hole, the nail tends to slide back into the magazine which may cause the head of the nail to be slightly misaligned with the driver of the fastener tool. This potential for misalignment is increased by the fact that most conventional pneumatic tools require the user to push on the tool downwardly against the workpiece to engage the safety mechanism, and to allow the tool to fire. Such pushing of the tool can also cause the nails to recede further into the nose assembly of the fastener driving device, thereby further increasing the potential for misalignment.

Moreover, the collation material such as paper, plastic, or metal strips that interconnect the nails together can accumulate in the drive channel of the nose of the fastener driving tool, and resist proper feeding of the next nail that is to be driven. Of course, such accumulation of the collation material can also cause misalignment. All of these factors that increase likelihood of misalignment can increase the frequency of tool jamming or blank firing in which no nail is driven.

Furthermore, as noted above, common nails for metal connectors are 2.5 inches and 1.5 inches, depending on the particular requirements of the specific application. Thus, two different sized nailers are required in order to drive these different sized nails, thereby adding to tool costs.

Therefore, there exists an unfulfilled need for a fastener driving device that more accurately controls the movement of nails as compared to conventional fastener driving devices. In addition, there also exists an unfulfilled need for such a fastener driving device that controls the movement of different sized nails that are driven by the fastener driving device.

SUMMARY

In view of the foregoing, an advantage of the present patent application is in providing a fastener driving device that reduces the likelihood of nail misalignment.

Another advantage of the present patent application is in providing such a fastener driving device that controls the movement of nails to reduce the likelihood of nail misalignment.

Yet another advantage of the present patent application is in providing such a fastener driving device capable of driving different sized nails.

Still another advantage of the present patent application is in providing a fastener driving device that controls the movement of different sized nails that are driven by the fastener driving device.

In view of the above, in accordance with the present patent application, a fastener driving device includes a nose assembly having a drive channel, a magazine for carrying a supply of fasteners through a feed channel along a feed channel direction toward the nose assembly, and a first stop pawl and a second stop pawl for preventing the supply of fasteners from moving along a direction opposite to the feed channel direction, wherein each of said first and second stop pawls has a distal end extending from a common side of the feed channel into the feed channel between adjacent first and second fasteners, said first stop pawl is closer to the drive channel than said second stop pawl.

In accordance with another aspect of the present patent application, a power tool includes a housing assembly, a nose assembly connected to the housing assembly, a magazine for carrying a supply of fasteners through a feed channel along a feed direction toward the nose assembly, and a plurality of stop pawls independently movable about a common pivot axis, wherein each stop pawl has a distal end extending into the feed channel from a common side of the feed channel.

In accordance with still another aspect of the present patent application, a fastener driving device for providing a fastener into a workpiece includes a housing assembly, a nose assembly connected to the housing assembly, the nose assembly having a drive channel, a magazine for carrying one of a supply of first fasteners and a supply of second fasteners through a feed channel along a feed direction to the nose assembly, the first and second fasteners having different lengths, at least one nail stop provided along an upper portion of the nose assembly to engage the first fasteners, and a movable nail stop having a distal end provided along a lower portion of the nose assembly and extending into the feed channel to engage and prevent the second fasteners from receding into the nose assembly, wherein the distal end of the movable nail stop is positioned for contact by the first fastener.

In accordance with yet another aspect of the present patent application, a power tool for providing first fasteners having a first length and second fasteners having a second length shorter than the first length into a workpiece includes a housing assembly, a nose assembly connected to the housing assembly, at least one first nail stop provided in the nose assembly for engaging head portions of the first fasteners, and at least one movable nail stop provided in the nose assembly for engaging head portions of the second fasteners, wherein the at least one movable nail stop is adapted to movably extend into a position to prevent the second fasteners from receding into the nose assembly.

In accordance with another aspect of the present patent application, a system for preventing misalignment of fasteners within a fastener driving device is provided, the fasteners having different first and second lengths, the system includes a drive channel to expel the fasteners into a workpiece, a feed channel providing the fasteners to the drive channel along a feed channel direction, a plurality of stop pawls positioned for engagement by each of the fasteners within the feed channel, and a plurality nail stops including a first nail stop positioned for engagement by head portions of the fasteners having the first length, a second nail stop positioned for engagement by head portions of the fasteners having the first length, and a movable nail stop positioned for engagement by head portions of the fasteners having the second length and engagement by shank portions of the fasteners having the first length, wherein the movable nail stop is movably provided within the feed channel between the first nail stop and at least one of the plurality of stop pawls.

These and other advantages and features of the present patent application will become more apparent from the following detailed description of the various embodiments of the present patent application when viewed in conjunction with the accompanying drawings.

BRIEF DESCRIPTION OF THE DRAWINGS

Embodiments of the patent application will now be described, by way of example only, with reference to the accompanying schematic drawings in which corresponding reference symbols indicate corresponding parts.

DETAILED DESCRIPTION

Figure 1:
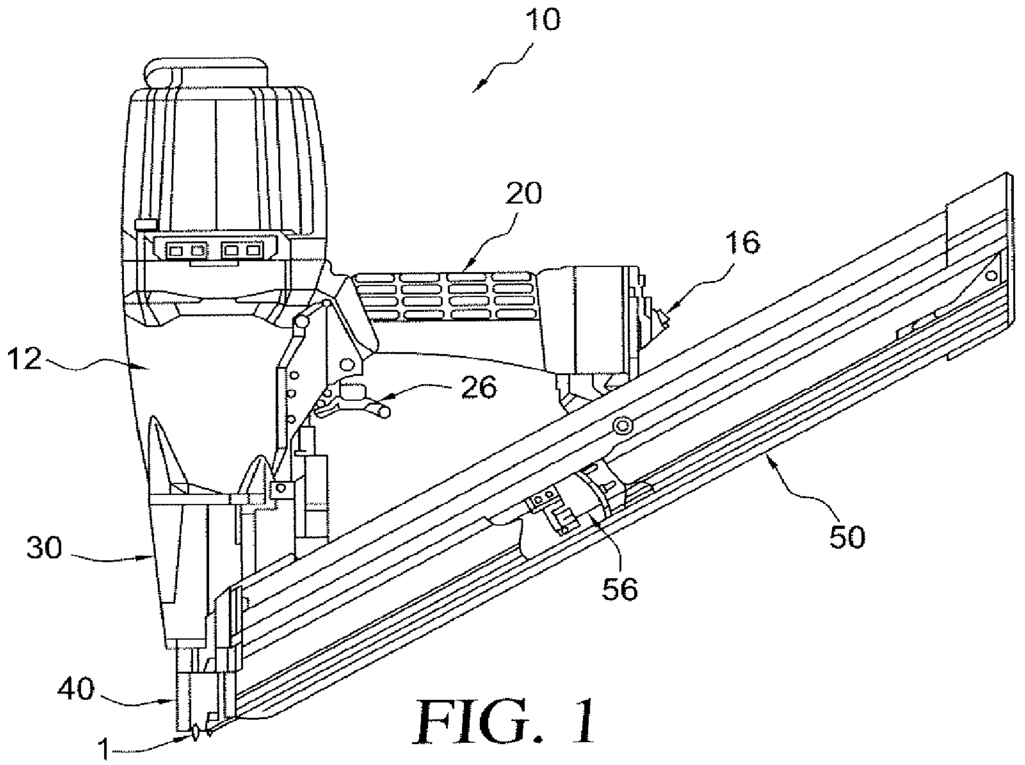
FIG. 1 is a side view of a fastener driving device according to an embodiment of the present patent application.

FIG. 1 illustrates a fastener driving device 10 according to one embodiment of the present patent application. The device 10 includes a housing 12 that is constructed from a lightweight, yet durable material, such as magnesium, aluminum, or other suitable material. The drive mechanism for driving the fastener is received within the housing 12 of the fastener driving device 10. In the illustrated embodiment, the fastener driving device 10 receives pressurized gas for driving the fasteners through a fitting opening 16 that is sized to receive an air fitting (not shown) that engages an air hose (not shown). In such an implementation, the pressurized gas may be air that has been compressed by a compressor, as is commonly used for pneumatic tools. In this regard, the drive mechanism for driving the fastener may be implemented in a conventional manner for nailers. However, in other implementations, the pressurized gas may be provided via a cartridge. Alternatively, gas that releases energy upon expansion may be used, such as a gas produced as a by-product of combustion, or gas produced by phase transformation of a liquid, such as carbon dioxide. In such alternative implementations, an appropriate drive mechanism would be provided within the housing 12 of the fastener driving device 10. The particular details of the drive mechanism is not critical to understanding the present patent application. Correspondingly, details thereof are omitted herein.

As illustrated, the fastener driving device 10 includes a handle 20 that extends substantially perpendicularly from the housing 12. The handle 20 is configured to be grasped by a user's hand, thereby making the device 10 portable. A trigger mechanism 26 is provided for actuating the drive mechanism of the fastener driving device 10. The fastener driving device 10 also includes a safety mechanism housing 30 that has various safety mechanisms therein to minimize the risk of injury to the user using the fastener driving device. Such safety mechanisms are known in the art, and thus, further discussions thereof are omitted herein.

The fastener driving device 10 further includes a nose assembly 40, the nose assembly 40 including a driver therein (not shown) which engages the head of the nail to rapidly expel the nail using the energy provided by the drive mechanism within the housing 12. In this regard, the nose assembly 40 receives consecutively fed fasteners from a magazine assembly 50. In the embodiment shown, one end of the magazine assembly 50 is connected to the nose assembly 40, and is also connected to the handle 20 at an intermediate location thereof. Of course, in other implementations, the magazine assembly 50 may be connected to the handle 20 at a distal end thereof.

The magazine assembly 50 is constructed and arranged to feed successive fasteners into the nose assembly 40 from a supply of fasteners loaded in the magazine assembly 50. In the illustrated embodiment, the supply of nails within the magazine assembly 50 is urged toward the nose assembly 40 by a pusher 56 that is biased towards the nose assembly 40. It should further be noted that although in the illustrated implementation, the magazine assembly 50 is configured to receive nails that are collated in a stick configuration, a magazine assembly that is configured to accommodate nails that are collated in a coil may also be used in other embodiments of the present patent application.

In addition, the nose assembly 40 and the magazine assembly 50 of the fastener driving device 10 of the illustrated embodiment are constructed and arranged to allow receipt of different sized nails. For example, the nose assembly 40 and the magazine assembly 50 may be implemented to receive nails having a first length of approximately 2.5 inches, or a second length of approximately 1.5 inches. Such nails may also be specifically designed for connecting a metal connector with a workpiece, the fastener driving device 10 of the present patent application being especially advantageous for driving such metal connectors. In this regard, the shank diameter of such nails may about 0.131 to 0.162 inches, and sized to pass through a hole in the metal connector, while the head of the fastener may be sized to prevent the fastener from passing entirely through the hole so that the metal connector may be fixedly secured to the workpiece. Of course, the above particularities of the nails are provided as an example only, and the fastener driving device 10 of the present patent application is not limited thereto.

Figure 2:
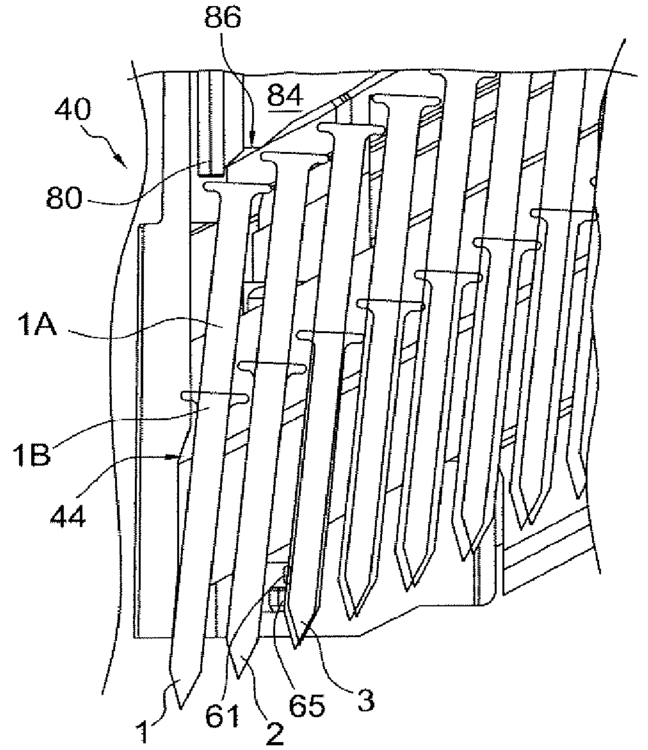
FIG. 2 is an enlarged cross-sectional view of the nose assembly of the driving device in accordance with one embodiment of the present patent application.

FIG. 2 is an enlarged, side cross-sectional view of the nose assembly 40 of the fastener driving device 10 in accordance with one embodiment of the present patent application. As can be seen, the nose assembly 40 includes a drive channel 44 into which the nail to be driven is fed from the magazine assembly 50. The first nail 1 that is received in the drive channel 44 is engaged by a drive pin (not shown) that engages the head of the first nail 1, and drives the first nail 1 using the force provided by the drive mechanism.

The schematic illustrations of nails having two different sizes are shown in FIG. 2 to illustrate the functional advantages provided by fastener driving device 10 of the present patent application. In particular, the longer length nails being fed through the magazine assembly 50 and into the nose assembly 40 may be 2.5 inches, while the shorter length nails also schematically shown may be 1.5 inches. In this regard, nails in particular position relative to the drive channel 44 are referred to herein using reference numerals (1, 2, 3, etc.), whereas specific length nails are identified using suffix "A" or "B". For instance, in specifically referring to the first nail 1, the longer length first nail is identified with reference numeral 1A, whereas the shorter length first nail is identified with reference numeral 1B. Thus, the fastener driving device 10 in accordance with the present patent application is implemented to allow driving of different sized nails.

Of course, it should be understood that both sized nails are not actually provided simultaneously into the nose assembly 40 or the magazine assembly 50 in an overlapping manner. However, both sized nails are illustrated in FIG. 2 to merely to show the positioning differences within the nose assembly 40 that can result by the differences in the length of the nails. In particular, as shown, the spacing between the collated nails are slightly different and can result in slightly different positioning of the nail to be driven, and the positioning of the nail being cued up to be driven (i.e. second nail 2). This difference in the positioning of the nails can be exacerbated by the various factors noted above, for example, by application of forward or downward force on the fastener driving device 10 by the user, or by the accumulation of the collation material that hold the collated nails together within the drive channel 44.

Figure 3A:
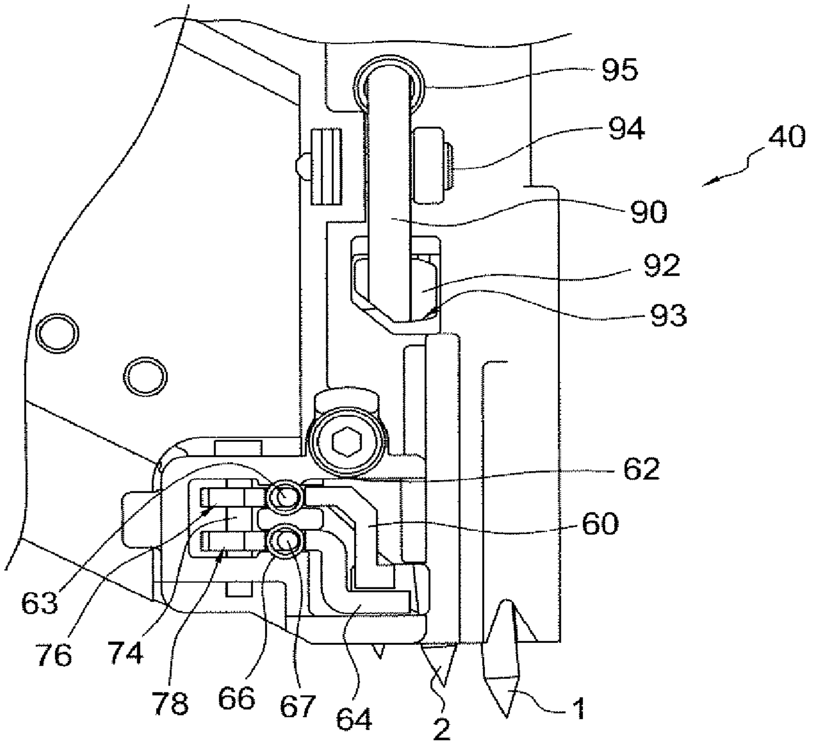
FIG. 3A is a side view of the nose assembly of the fastener driving device with a cover removed to clearly illustrate the stop pawls and the movable nail stop in accordance with one embodiment of the present patent application.

FIG. 3A is a side view of the nose assembly 40 of the fastener driving device 10 with a cover (not shown) removed to clearly illustrate the first stop pawl 60, the second stop pawl 64, and the movable nail stop 90, in accordance with one embodiment of the present patent application, the function of which are described in further detail herein below. As shown in FIG. 3A, the first stop pawl 60 and the second stop pawl 64 are pivotally connected to the nose assembly 40 of the fastener driving device 10 by a stop pawl pivot 74. The first and second stop pawls 60 and 64, respectively, extend into the nose assembly 40 as shown in FIG. 2. The first and second stop pawls 60 and 64 are made of hardened steel, and may be cast or stamped.

Figure 4A:
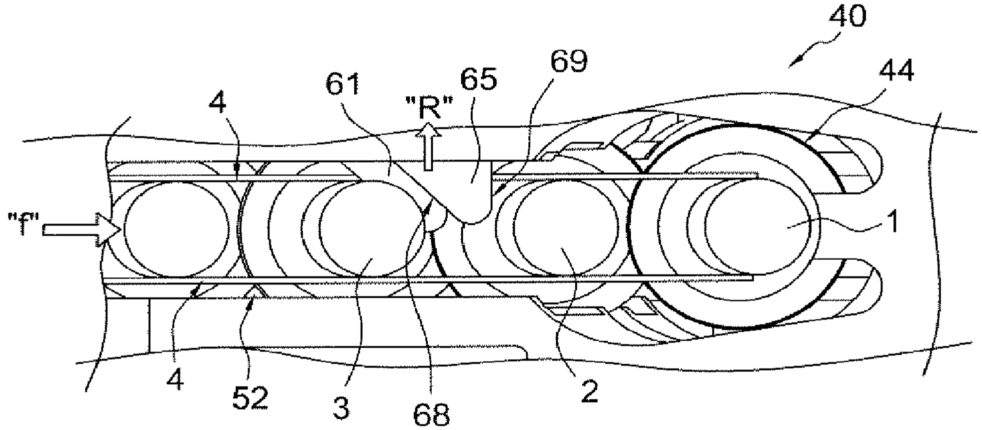
FIG. 4A is a cross-sectional, underside view of the nose assembly looking down the truncated shank of the nails, the figure clearly illustrating the operation of the stop pawls in accordance with one implementation of the present patent application.

In the above regard, FIG. 4A shows a partial cross-sectional underside view of the nose assembly 40 looking down the truncated shank of the nails, thus showing the operation of the first and second stop pawls 60 and 64. In particular, referring to both FIGS. 2 and 4A, the distal end 61 of the first stop pawl 60 extends into a first position along the feed channel 52 of the collated nails to limit the movement of the second nail 2 back into the magazine assembly 50, opposite the normal feed direction indicated by arrow "f". As previously explained, such movement of the nails can occur, for example, when the fastener driving device 10 is pushed forward with the first nail 1 engaged against the workpiece within the hole of the metal connector. The distal end 65 of the second stop pawl 64 extends into a second position along the feed channel 52 of the collated nails which is slightly closer to the drive channel 44 of the nose assembly 40 than the distal end 61 of the first stop pawl 60. In other words, along the feed direction "f", the distal end 65 of the second stop pawl 64 is further downstream from the distal end 61 of the first stop pawl 60 so that the nails reach the distal end 61 of the first stop pawl 60 first, and then reach the distal end 65 of the second stop pawl 64.

As most clearly shown in FIG. 4A, the distal end 65 of the second stop pawl 64 has a triangular, wedge-like shape, with a ramp surface 68 and an abutment surface 69. The ramp surface 68 is contacted by the shank of the nails as they are fed through the feed channel 52 along the feed direction "f" to facilitate retraction of the second stop pawl 64, while the abutment surface 69 limits the reverse movement of the second nail 2 along a direction opposite to the feed direction "f". As the nail is fed along the feed channel 52 toward the drive channel 44, the shank of the nail contacts the ramp surface 68 of the second stop pawl 64, and the angle of the ramp surface 68 causes the distal end 65 of the second stop pawl 64 to retract in the direction of arrow "R" so that it is out of the pathway of the nail. The distal end 61 of the first stop pawl 60 is also shaped in a substantially similar manner with a ramp surface and an abutment surface (not fully shown) to allow the first stop pawl 60 to function in a manner similar to the second stop pawl 64.

Figure 3B:
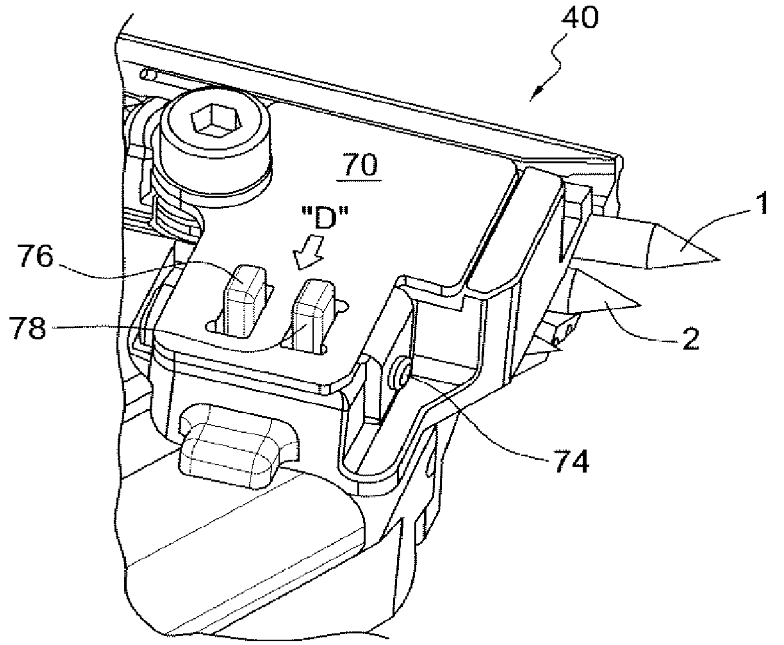
FIG. 3B is a perspective side view of the nose assembly with the cover attached, and the pivot extensions protruding therethrough.

As described above relative to FIG. 3A, the first stop pawl 60 and the second stop pawl 64 are pivotally connected to the nose assembly 40 of the fastener driving device 10 by a stop pawl pivot 74. Moreover, the first stop pawl 60 and the second stop pawl 64 are biased by springs 62 and 66, respectively, so that their distal ends 61 and 65 of the first and second stop pawls 60 and 64, respectively, are biased to extend into the feed channel 52 of the collated nails in the manner shown in FIG. 2, thereby resisting the retraction of the corresponding distal ends 61 and 65 of the first and second stop pawls, respectively. These springs 62 and 66 are coil springs in the illustrated implementation of FIG. 3A and further engage the cover 70 shown in FIG. 3B to bias the stop pawls. In this regard, the first stop pawl 60 includes a protrusion 63, and the second stop pawl 64 includes protrusion 67 for assisting in locating and guiding the springs 62 and 66 as they are compressed by the passage of the shank of the nails in the feed channel 52. Of course, other embodiments of the stop pawls may be implemented using different types of springs, for example, leaf springs or torsion springs. The first stop pawl 60 also includes pivot extension 76 and the second stop pawl 64 includes pivot extension 78 that protrude through corresponding openings in the cover 70 as most clearly shown in FIG. 3B. These pivot extensions can be actuated in the direction of arrow "D" by the user to disengage the corresponding stop pawls in the manner described in further detail below.

In operation, the first stop pawl 60 is retracted from the feed channel 52 as the shank of the nail contacts the ramped surface of the distal end 61. As soon as the nail is fed beyond the abutment surface of the first stop pawl 60, the first stop pawl 60 is returned by the biasing force of the spring 62 so that the distal end 61 is extended into the feed channel 52. In a similar manner, the second stop pawl 64 is retracted from the feed channel 52 as the shank of the nail contacts the ramped surface 68 of the distal end 65, and extended into the feed channel 52 by the biasing force of the spring 66 when the nail passes beyond the abutment surface 69 of the second stop pawl 64. Importantly, the first stop pawl 60 and the second stop pawl 64 act independently of each other in one embodiment shown and described above. In particular, although both the first and second stop pawls 60 and 64 are pivotally mounted to the same stop pawl pivot 74, they are otherwise unconnected to each other, allowing them to independently retract from, and extend into, the feed channel 52 of the magazine assembly 50.

In addition, as can be clearly seen in FIGS. 2 and 4A, both the first and second stop pawls 60 and 64 are positioned to be between the second nail 2 and the third nail 3 within the drive channel 44, and function to prevent the second nail 2 from being moved along a reverse direction opposite to the feed direction "f" via the abutment surfaces of the first and second stop pawls 60 and 64. The positioning of the second nail 2 correlates to the position of the first nail 1 because they are interconnected by the collation material 4 shown in FIG. 4A. Whereas restricting the movement of the first nail 1 would be ideal, such restriction is difficult to implement because the first nail 1 is received in the drive channel 44, and is driven by the drive mechanism into the workpiece. In view of this difficulty, the potential for misalignment of the first nail 1 in the drive channel 44 that is to be driven into the workpiece can still be minimized by limiting undesirable movement of the second nail 2. Moreover, restricting the movement of the second nail 2 is more desirable than restricting the movement of a different nail, such as the third nail 3, since the correlation to the position of the first nail 1 is further diminished due to the increased distance and length of the collation material 4.

The slightly different positioning of the distal end 61 of the first stop pawl 60 and the distal end 65 of the second stop pawl 64, allows the stop pawls of the present patent application to engage and prevent reverse movement of the second nail 2 even when different sized nails are driven using the same fastener driving device 10. As noted above, the variation in positioning of the second nail 2 due to the size of the nail is clearly shown in FIG. 2 that schematically illustrates the profiles of different sized nails. Of course, such variation is further increased if there are differences in the shank diameters between the nails, or there are variations in the dimensions of the nails due to manufacturing tolerances. However, the two stop pawls can be implemented so that their respective distal ends are positioned at a sufficient distance to ensure at least one of the distal ends extend into the feed channel 52 to prevent substantial movement of the second nail 2 along the reverse direction opposite to the feed direction "f".

Furthermore, as previously explained, variation in positioning and possible misalignment of the first nail 1 can occur due to accumulation of the collation material 4 within the drive channel 44. Such variation and misalignment likewise changes the position of the second nail 2 by the fact that the first nail 1 and the second nail 2 are interconnected by the collation material 4. Thus, the slightly different positioning of the first stop pawl 60 and the second stop pawl 64 ensures that even with this variation in positioning caused by accumulated collation material 4, at least one of the two stop pawls extend into the feed channel 52 to prevent substantial movement of the second nail 2 along the reverse direction opposite to the feed direction "f".

As can be appreciated by examination of FIG. 4A, in one embodiment, the first and second stop pawls 60 and 64 are implemented so that their respective distal ends 61 and 65, respectively, are positioned only slightly offset from each other along the feed channel 52, the first stop pawl 60 being positioned on top of the second stop pawl 64. Thus, in the underside view of FIG. 4A, the first and second stop pawls 60 and 64 overlap each other, and the abutment surfaces are spaced at a distance that is less than the shank diameter of the nails. Of course, in other implementations of the present patent application, the first and second stop pawls 60 and 64 may be positioned separately, and may be retractably mounted using separate pivot pins. For example, one stop pawl may be provided on one side of the nose assembly 40 while another stop pawl may be provided on an opposite side of the nose assembly 40. Furthermore, additional stop pawl(s) may be provided, or implemented to engage a different nail, such as nail 3, in other embodiments of the patent application.

Figure 4B:
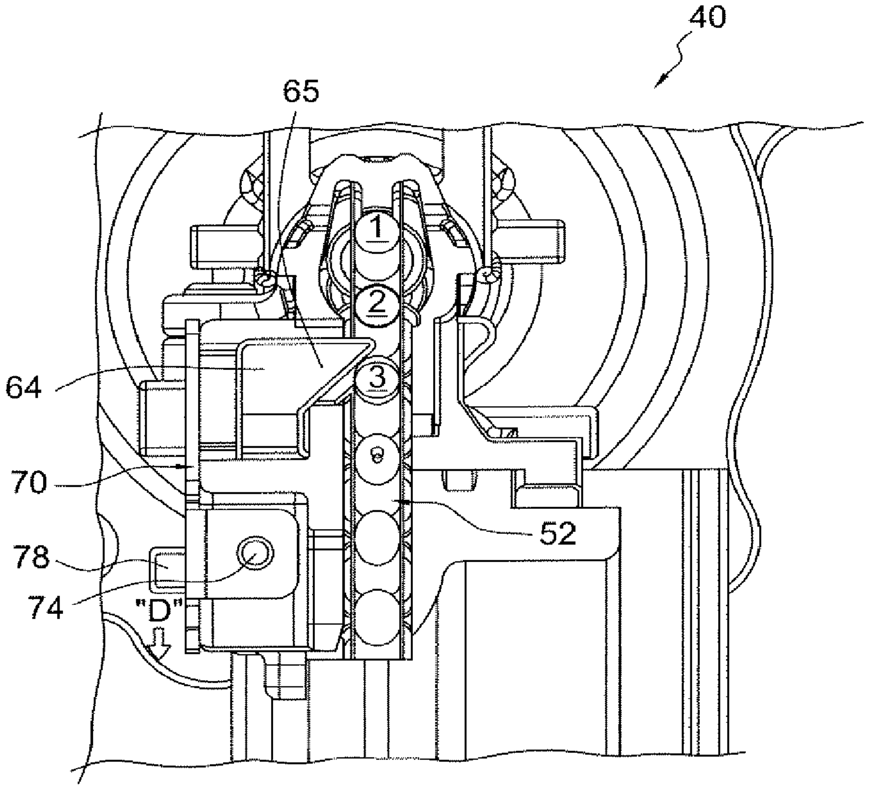
FIG. 4B is also an underside view of the nose assembly which clearly shows the pivot extension.

Referring again to FIG. 3B, the first stop pawl 60 can be disengaged by actuating the pivot extension 76 in the direction of arrow "D", and the second stop pawl 64 can be disengaged by actuating the pivot extension 78 along the direction of arrow "D". FIG. 4B also illustrates in detail, the interconnection between the distal end 65 of the second stop pawl 64 and the pivot extension 78 that extends through the cover 70. As can be appreciated, by actuating the pivot extension 78 along the direction of arrow "D", the distal end 65 can be manually retracted from extending into the feed channel 52 as the second stop pawl 64 pivots about the stop pawl pivot 74. Of course, manual disengagement of the first stop pawl 64 can be attained in a similar manner by actuating the pivot extension 76 along the direction of arrow "D". Of course, by the virtue of the springs 62 and 66, the first and second stop pawls 60 and 64 will retract once the pivot extensions 76 and 78 are released. In other embodiments, a lock mechanism may be provided to maintain the disengaged positions for the pivot mechanism.

Figure 5:
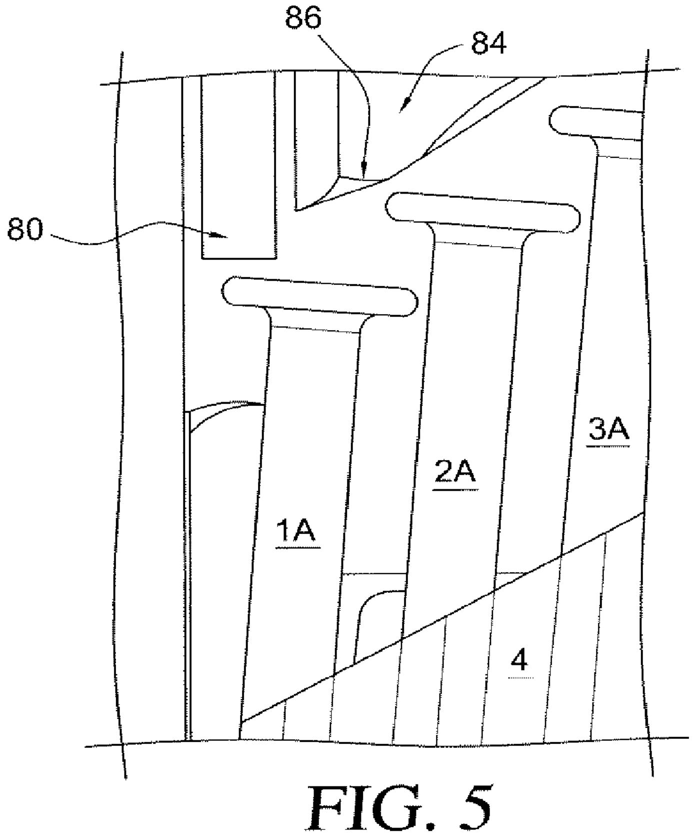
FIG. 5 is a side cross-sectional view of the nose assembly clearly showing first and second nail stops for a long length nail in accordance with one implementation of the present patent application.

As discussed above, the fastener driving device 10 in accordance with the present patent application is implemented for use with different sized nails, FIG. 2 schematically showing the longer 2.5 inch nails and shorter 1.5 inch nails that may be driven by the illustrated implementation of the fastener driving device 10. FIG. 2 also shows a first nail stop 80 which prevents the longer first nail 1A from receding into the drive channel 44 of the nose assembly 40, for example, when the user of the fastener driving device 10 presses the device downwardly into the workpiece as previously described. The first nail stop 80 provides a physical barrier to limit the extent to which the longer first nail 1A can recede into the nose assembly 40. FIG. 5 shows an enlarged cross-sectional view of the nose assembly 40 that more clearly shows the first nail stop 80.

In accordance with the present embodiment shown in FIGS. 2 and 5, the fastener driving device 10 is also provided with a second nail stop 84 which prevents the second nail 2A from receding into the nose assembly 40, thereby aiding the function of the first nail stop 80. In particular, because the first and second nails 1A and 2A are interconnected by the collation material 4, if the first nail 1A is pressed upon so that it begins to recede into the nose assembly 40, the second nail 2A also recedes into the nose assembly 40. The second nail stop 84 includes a land surface 86 that engages a portion of the head of the second nail 2A to limit receding of the second nail 2A into the nose assembly 40. Thus, even if the first nail 1A is slightly misaligned, thereby reducing the effectiveness of the first nail stop 80, the second nail stop 84 can assist in preventing the first nail 1A from further receding into the nose assembly 40.

As noted, the fastener driving device 10 in accordance with the present patent application is implemented for use with different sized nails. Correspondingly, whereas the first nail stop 80 and the second nail stop 84 described above can limit receding of the longer nails (for example, 2.5 inch nails) into the nose assembly 40, they do not limit receding of the shorter nails (for example, 1.5 inch nails) into the nose assembly 40 at all. This is most clearly shown in FIG. 2 which shows the relative height difference between the longer and shorter nails in an example implementation of the fastener driving device 10 in accordance with the present patent application.

Figure 6:
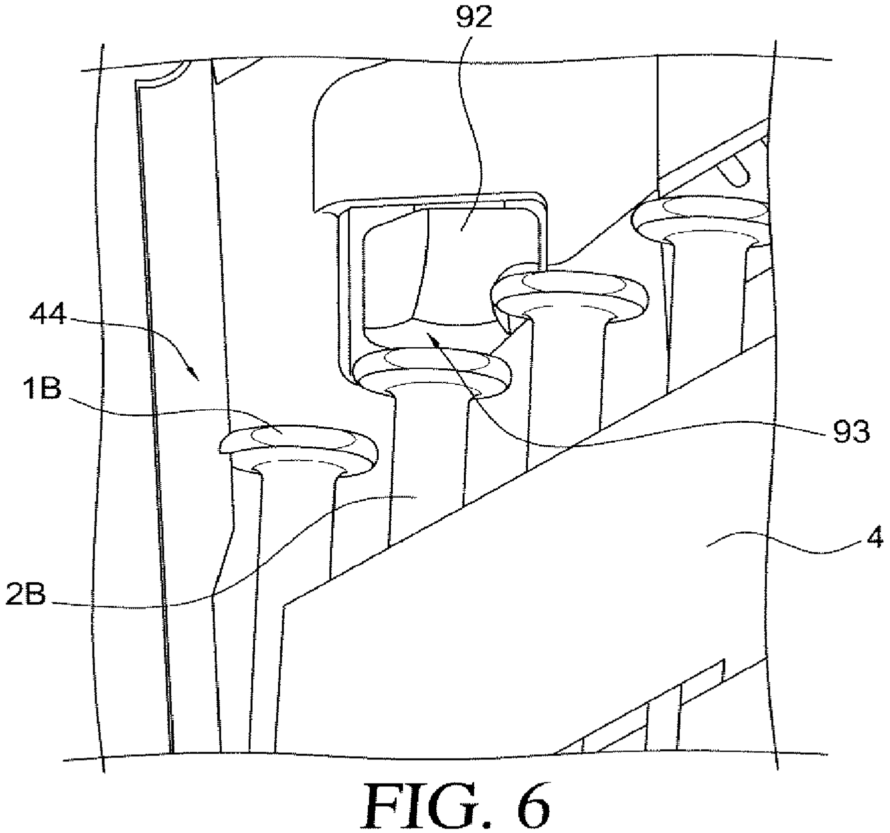
FIG. 6 is a side cross-sectional view of a movable nail stop for a short length nail in accordance with one implementation of the present patent application.
Figure 7:
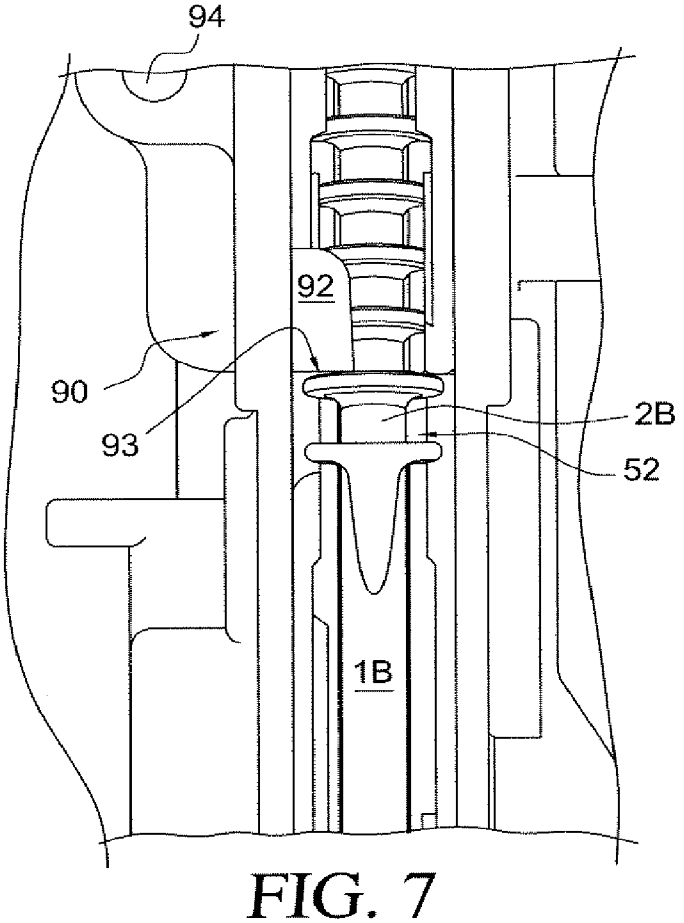
FIG. 7 is a front end, cross-sectional view of the nail stop shown in FIG. 6 that clearly shows the movable nail stop preventing the short length nail from receding into the nose assembly of the fastener driving device.

In view of the above, as shown in FIGS. 3A, 6 and 7, the fastener driving device 10 is also provided with a movable nail stop 90 to limit receding of the second nail 2B when the fastener driving device 10 is used to drive short nails, thereby minimizing receding of the first nail 1B. In this regard, FIG. 6 shows an enlarged side view of the movable nail stop 90, and FIG. 7 shows an end cross-sectional view of the movable nail stop 90 in operation to prevent the second nail 2B from receding into the nose assembly 40. As shown in these figures, the movable nail stop 90 is provided in the nose assembly 40 immediately adjacent to the drive channel 44. The movable nail stop 90 includes a distal end 92 with an abutment surface 93 that extends into the feed channel 52, and is immediately above the head of the short second nail 2B. Correspondingly, the distal end 92 prevents the short second nail 2B from receding into the nose assembly 40 by providing a physical barrier.

Figure 8:
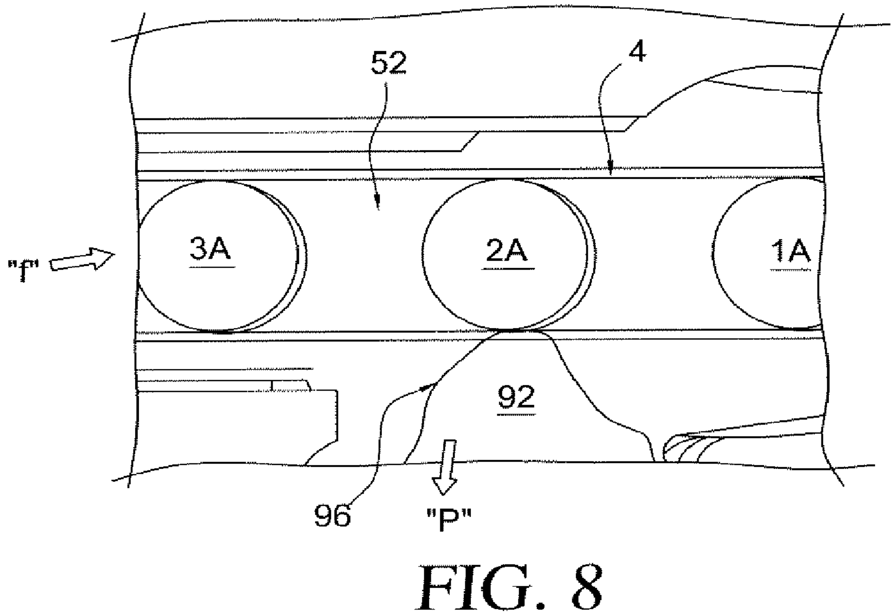
FIG. 8 is a top cross-sectional view of the nail stop being pivoted in the direction of the arrow to allow feeding of the long length nail.

As shown in FIG. 3A, the movable nail stop 90 is mounted to the nose assembly 40 via nail stop pivot 94. In this regard, the movable nail stop 90 is biased by spring 95 so that the distal end 92 protrudes into the feed channel 52. This allows the movable nail stop 90 to be pivoted out of the feed path of the nails when the fastener driving device 10 used to drive long nails instead of short nails shown in FIGS. 6 and 7. In particular, as most clearly shown in the top cross-sectional view FIG. 8 which illustrates a sectional view of the distal end 92, the movable nail stop 90 is provided with a ramp surface 96 which allows the shank of the longer nails to engage and pivot the distal end 92 in the direction of arrow "p", thereby moving the nail stop 90 out of the way. The movable nail stop 90 is made of hardened steel, and may be cast or stamped.

Thus, when the fastener driving tool 10 is being used to drive short nails, such as 1.5 inch nails, the movable nail stop 90 functions to limit receding of the second nail 2B, which in turn, resists receding of the first nail 1B into the drive channel 44 due to their interconnection by the collation material 4. When the fastener driving tool 10 is being used to drive long nails, such as 2.5 inch nails, the movable nail stop 90 allows the long nails to be fed into the drive channel 44 by being pivoted out of the way of the long nails. As can be appreciated, nail stops such as the first nail stop 80 or second nail stop 84 previously described cannot be easily implemented to prevent receding of the short nails because such features will prevent feeding of the long nails into the drive channel 44. Correspondingly, the above described pivoting action of the movable nail stop 90 is desirable so that the distal end 92 of the movable nail stop 90 is out of the feed channel 52, and does not impede feeding of the longer nails into the drive channel 44.

Thus, in view of the above it should be evident to one of ordinary skill in the art, how the present patent application provides an improved fastener driving device that reduces the likelihood of fastener misalignment. In addition, it should also be evident to one of ordinary skill how the fastener driving device of the present patent application more accurately controls the movement of nails as compared to conventional fastener driving devices. Furthermore, it should also be evident how the fastener driving device of the present patent application may be used to drive different sized nails. As explained above relative to one embodiment, the stop pawls and the nail stops work together to support the nails by limiting their movement within the nose assembly and the magazine when the tool is pushed into the workpiece. In addition, the stop pawl and the nail stop work together to provide better control of the nail being driven by consistently presenting a single nail to the drive channel of the nose assembly.

While various embodiments in accordance with the present patent application have been shown and described, it is understood that the present patent application is not limited thereto. The present patent application may be changed, modified and further applied by those skilled in the art.

Therefore, this patent application is not limited to the detail shown and described previously, but also includes all such changes and modifications.

What is claimed is:

1. A fastener driving device for providing a fastener into a workpiece, comprising:

a housing assembly;

a nose assembly connected to the housing assembly, the nose assembly having a drive channel;

a magazine for carrying one of a supply of first fasteners and a supply of second fasteners through a feed channel along a feed direction to the nose assembly, wherein the feed channel includes a longitudinal axis that is substantially perpendicular to the feed direction, wherein the nose assembly and the magazine are constructed and arranged to allow receipt of the first fasteners having a first length and the second fasteners having a second length different from the first length, wherein the first length of the first fastener and the second length of the second fastener extend along the longitudinal axis of the feed channel, at least one nail stop provided along an upper portion of the nose assembly, the at least one nail stop configured to engage and limit the first fasteners having the first length from receding into the nose assembly; and a movable nail stop having a distal end provided along a lower portion of the nose assembly and extending into the feed channel to engage and prevent the second fasteners having the second length from receding into the nose assembly, wherein the distal end of the movable nail stop is positioned for contact by the first fastener having the first length, and wherein, along the longitudinal axis of the feed channel, the lower portion of the nose assembly is positioned below the upper portion of the nose assembly.

2. A fastener driving device according to claim 1, wherein the movable nail stop is pivotally mounted to the nose assembly and biased by a spring to retractably provide the distal end into the feed channel.

3. A fastener driving device according to claim 1, wherein the distal end includes a ramp surface to allow the first fasteners having the first length to engage and pivot the movable nail stop out of the feed channel.

4. A fastener driving device according to claim 3, wherein the distal end includes an abutment surface engaging a head portion of the second fasteners having the second length.

5. A fastener driving device according to claim 1, wherein the at least one nail stop is configured to limit receding of the first fasteners having the first length into the nose assembly when the fastener driving device drives the first fasteners having the first length.

6. A fastener driving device according to claim 5, wherein the at least one nail stop is configured not to engage with the second fasteners having the second length.

7. A fastener driving device according to claim 5, wherein the at least one nail stop is configured not to limit receding of the second fasteners having the second length.

8. A fastener driving device according to claim 1, wherein the at least one nail stop includes a first nail stop and a second nail stop, wherein the first nail stop is configured to provide a physical barrier to limit the receding of a first of the first fasteners having the first length into the nose assembly, and wherein the second nail stop is configured to prevent a second of the first fasteners having the first length from receding into the nose assembly.

9. A fastener driving device according to claim 8, wherein the second nail stop is configured to aid the first nail stop because the first and the second of the first fasteners having the first length are interconnected by a collation material.

10. A fastener driving device according to claim 8, wherein the second nail stop is configured to assist in preventing the first of the first fasteners having the first length from further receding into the nose assembly.

11. A fastener driving device according to claim 8, wherein the second nail stop includes a land surface that engages a portion of the head of the second of the first fasteners having the first length to limit receding of the second of the first fasteners having the first length into the nose assembly.

12. A fastener driving device according to claim 1, wherein the movable nail stop is configured to prevent receding of the second fasteners having the second length into the nose assembly when the fastener driving device drives the second fasteners having the second length.

13. A fastener driving device according to claim 1, wherein the movable nail stop is configured to be pivoted out of the feed channel when the fastener driving device drives the first fasteners having the first length.

14. A fastener driving device according to claim 13, wherein the movable nail stop is provided with a ramp surface that allows a shank of the first fasteners having the first length to engage and pivot the distal end, thereby moving the movable nail stop out of the feed channel.

15. A fastener driving device according to claim 1, wherein, when the fastener driving device drives the second fasteners having the second length, the movable nail stop is configured to limit receding of a first of the second fasteners having the second length, which in turn, resists receding of a second of the second fasteners having the second length into the drive channel due to their interconnection by a collation material.

16. A fastener driving device according to claim 1, wherein, when the fastener driving device drives the first fasteners having the first length, the movable nail stop is configured to allow the first fasteners having the first length to be fed into the drive channel by being pivoted out of the way of the first fasteners having the first length.

17. A fastener driving device for providing a fastener into a workpiece, comprising:

a housing assembly;

a nose assembly connected to the housing assembly;

a magazine for carrying one of a supply of first fasteners and a supply of second fasteners through a feed channel along a feed direction to the nose assembly, wherein the feed channel includes a longitudinal axis that is substantially perpendicular to the feed direction, wherein the nose assembly and the magazine are constructed and arranged to allow receipt of the first fasteners having a first length and the second fasteners having a second length shorter than the first length;

wherein the first length of the first fastener and the second length of the second fastener extend along the longitudinal axis of the feed channel, a first nail stop provided in the nose assembly for engaging head portions of the first fasteners having the first length and for preventing the first fasteners having the first length from receding into the nose assembly; and at least one movable nail stop provided in the nose assembly for engaging head portions of the second fasteners having the second length, wherein the at least one movable nail stop is adapted to movably extend into a position to prevent the second fasteners having the second length from receding into the nose assembly, and wherein, along the longitudinal axis of the feed channel, the at least one movable nail stop is positioned below the first nail stop.

18. A fastener driving device according to claim 17, wherein the at least one movable nail stop movably extends between two adjacent first fasteners having the first length.

19. A fastener driving device according to claim 17, further including a second nail stop provided in the nose assembly for engaging head portions of the first fasteners having the first length, said first nail stop and said second nail stop preventing the first fasteners having the first length from receding into the nose assembly.

20. A fastener driving device according to claim 17, wherein the nose assembly includes a drive channel for driving the first and second fasteners, and the at least one movable nail stop is positioned immediately adjacent to the drive channel.

21. A fastener driving device according to claim 20, wherein the movable nail stop extends along a direction parallel to the drive channel.

22. A fastener driving device according to claim 21, wherein the movable nail stop is mounted to the nose assembly by a nail stop pivot that extends along a direction perpendicular to the drive channel.

23. A fastener driving device according to claim 22, wherein the movable nail stop is biased into the feed channel by the nail stop pivot and a spring.

24. A fastener driving device according to claim 17, further comprising a plurality of stop pawls extending into the feed channel at a position below the movable nail stop.

* * * * *